March 23, 1965 L. LACOSTE 3,174,940
PROCESS OF PREPARING A MOLDED ARTICLE FROM A
THERMOSETTING FORMALDEHYDE RESIN AND SAWDUST
Filed Feb. 17, 1961 2 Sheets-Sheet 1

INVENTOR
Lucien Lacoste
By Shoemaker & Mattare
ATTORNEYS.

INVENTOR
Lucien Lacoste
BY Shoemaker and Mattare
ATTORNEYS

3,174,940
PROCESS OF PREPARING A MOLDED ARTICLE FROM A THERMOSETTING FORMALDEHYDE RESIN AND SAWDUST
Lucien Lacoste, Totton, Southampton, England, assignor, by mesne assignments, to Rhoads Molded Products Inc., a corporation of Delaware
Filed Feb. 17, 1961, Ser. No. 90,046
1 Claim. (Cl. 260—17.2)

This application is a continuation-in-part of Serial No. 830,352, filed July 29, 1959, now abandoned.

This invention relates to a cellulose molded product, compositions therefor, and a process for making same.

An object of this invention is to provide a new molded product, container or receptacle.

Another object is to provide a receptacle or container formed from cellulose and a thermosetting binder.

A further object is to provide a light-weight, strong, fracture resistant, permeable receptacle from cellulose and a thermosetting resin.

Another object is to provide a new receptacle which is well adapted for use as a horticultural container and which results in unusual advantages as to propagation of seeds and the growth of plant life.

A further object is to provide a new composition for a product, container or receptacle.

A still further object is to provide a process for making a new product, container or receptacle, and further to provide a process for molding a strong, light-weight, porous, fracture resistant product or container molded from cellulose such as sawdust and a thermosetting binder.

It has already been proposed to manufacture a receptacle by molding to the required shape under heat and pressure a mixture of a synthetic resin and an organic or inorganic substance, removing the outer surface or skin formed during the molding operation on the surface of the molded article from all or a part of the article or treating the molded article by a physical or chemical means to remove soluble substances incorporated therein to leave fine capillary canals in the molding.

This invention provides a product, receptacle or container made by molding to shape, in which the desired porosity is obtained without any additional operations such as removal of a pressing skin formed in the molding operation or the removal of soluble substances to leave capillary canals in the article and is accomplished through the use of a molding material or mixture containing wood sawdust or other cellulose material, the particles of which are bonded together in the molding process.

Figure 1:
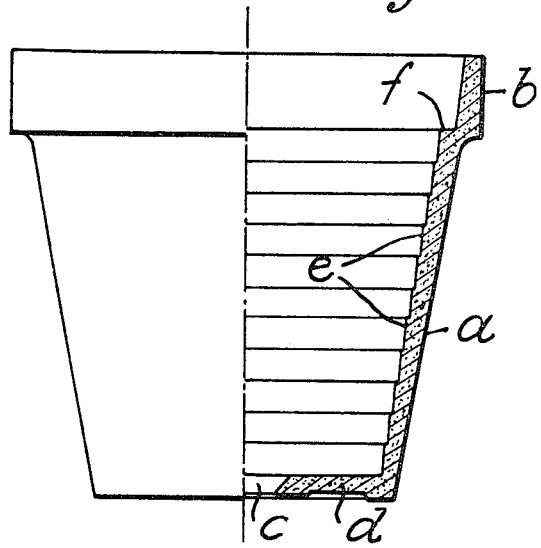
FIG. 1 is an elevation half in section of a receptacle embodying the invention.
Figure 2:
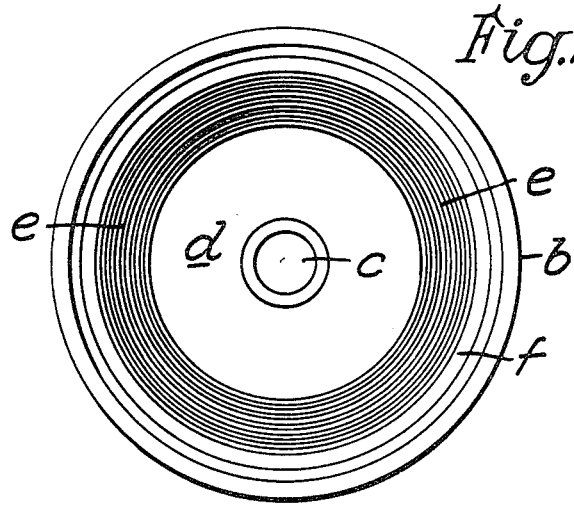
FIG. 2 is a plan of the same.

The container or receptacle as shown in the drawings of FIG. 1 is of frusto conical shape. The wall $a$ sloping outwardly to facilitate nesting during storage of the containers is provided with a smooth exterior surface. The container is provided also with an external rim or flange $b$ at its upper end or mouth and a drainage aperture $c$ in the base $d$, if desired.

The wall $a$ is stepped interiorly, a plurality of narrow steps $e$ being shown as well as a broader step $f$ formed within the rim or flange $b$ near the upper end or mouth of the container. These steps which continue around the interior of the receptacle form strengthening rings, each ring being of substantially the same thickness. The broader steps $f$ serve as a ledge which may be used to locate a disc of paper, plastic or metal to serve as a cover for the contents of the receptacle. The receptacle may then be used as a merchandising container, for example, to merchandise fertilizer or other garden supplies and when empty, will then provide a receptacle which may be nested due to its frusto conical shape and which may also be put to other use such as a horticultural container or receptacle.

The container is formed from cellulose material, preferably wood sawdust, bonded with one or more synthetic resins and molded under heat and pressure to the desired shape. While the receptacle of FIG. 1 has been shown as being frusto conical in cross section, it is understood that the receptacle may be rectangular in shape and be provided with straight walls rather than the tapered walls as set forth in the drawings. The sawdust is combined with a suitable synthetic resin and a hardener and the mixture is molded in a suitable mold under heat and pressure to the desired shape, the mold providing the receptacle with a smooth exterior, the internal steps $e$ and $f$ and the aperture in the base where desired. The receptacle or container may, if desired, be colored to the requirements of the trade by the addition of coloring matter to the molding mix before the molding takes place. For instance, the containers may be colored red by the addition of suitable coloring compounds to contrast with the contents of the conainers. The containers may also be made resistant to mildew by the addition of suitable fungicides to the molding mix prior to the molding operation. The improved receptacles, in addition to being very light in weight, are resistant to fracture and are very porous. Where the container is used in the horticultural field, the porosity of the container is extremely important. The containers of the present invention are more porous than clay pots or receptacles used in the horticultural field, but do not allow the moisture of the soil retained in the container to evaporate as quickly as such evaporation would take place in a clay container. In clay receptacles used in the horticultural field, the evaporation of the moisture in the soil produces a refrigerating effect on the soil therein which tends to lower the temperature of the soil and act as a deterrent on the growth of the plant, whereas in the improved container the change of temperature of the soil after watering the plant retained in this container is very much less marked and the root growth of the plant contained in this container is accelerated.

COMPOSITION

As indicated hereinbefore, the containers or receptacles of the present invention are molded from cellulose material such as wood sawdust bonded with one or more synthetic resins and molded under heat and pressure. In general, all kinds or types of wood sawdust are usable for this purpose, but it has been found by experience that the wood giving the best results is freshly sawn soft wood.

The wood sawdust after being processed in the manner discussed hereinafter is mixed with a synthetic resin having thermosetting characteristics and selected from the group consisting of amino plastics and phenolic resins. The phenolic resins may be selected from the group consisting of phenol formaldehyde, cresol formaldehyde, xylenol formaldehyde, and resorcinal formaldehyde, and said amino plastic resin may be selected from the group consisting of a thiourea formaldehyde, melamine formaldehyde, and urea formaldehyde.

In order to facilitate the molding operation and to procure a high rate of production, a hardening agent such as aluminum sulphate is added to the thermosetting resin. A coloring agent such as red oxide of iron may be added and to make the product more water resistant a suitable wax powder may also be added.

In addition, a small percentage of urea powder is added to the composition serving to combine with any free formaldehyde that is released from the molding composition during the molding operation.

In general, containers or receptacles of this invention may be formulated by using a molding composition which includes approximately 60 to 90 percent cellulose, such as wood sawdust, and ten to 40 percent resin including the hardener and a small percent of wax, coloring material and urea powder.

In the production of a container or receptacle which is particularly useful in the horticultural field as a plant container or seed tray, it has been found that the following formulation provides a permeable, strong, lightweight, fracture resistant receptacle when molded and cured under the proper conditions of time and temperature:

Example I

| | Percent |
|---|---|
| Prepared sawdust | 80 |
| Urea formaldehyde resin including hardener (ammonium chloride) | 14.98 |
| Wax powder | 3.60 |
| Color (red oxide of iron) | 1.19 |
| Urea powder | .22 |
| Mold release agent | .01 |

Example II

| | Percent |
|---|---|
| Prepared sawdust | 80 |
| Urea formaldehyde resin including hardener (aluminum sulfate) | 14.98 |
| Wax powder | 3.60 |
| Color (red oxide of iron) | 1.19 |
| Urea powder | .22 |
| Mold release agent | .01 |

The composition of Examples I or II when properly mixed and molded for one minute at between 200 to 250° F. under a pressure of 600 to 800 pounds per square inch provides a receptacle or container which is more porous than a clay container normally used in the horticultural field and has an impact strength far exceeding that of any clay pot or receptacle of comparable dimension.

Containers formed from the above-noted formulation were molded and were compared with clay containers of substantially the same size and shape in the following manner:

Six clay pots or receptacles were placed on a shelf 12 inches above a concrete floor while six bonded sawdust receptacles of the same size and shape were placed on a shelf 6 feet above the same concrete floor. All twelve receptacles were simultaneously pushed from their respective shelves. All six of the clay receptacles fractured upon contact with the concrete floor.

The receptacle of the present invention while falling six times as far as the clay receptacles did not fracture and was completely undamaged. There was no indication on any of the containers of the present invention of their contact with the concrete floor; there was no fracture and no visible damage.

The preferred thermosetting resin used in the present invention is urea formaldehyde, mainly because of its ready availability and its low cost, although as indicated, other resins can be used in the molding compositions. The urea formaldehyde is preferably used in the solid form containing a solid acid forming hardening agent such as ammonium chloride or aluminum sulphate. The usual solid form of urea formaldehyde resin is dimethylolurea $CO(NHCH_2OH)_2$ or (1,3 bis) hydroxymethyl urea (DMU) which is available as a white chalky solid.

Monomethylolurea $H_2NCONHCH_2OH$ is of a lower formaldehyde-urea ratio than DMU and is readily prepared by dissolving dimethylolurea with one part of urea. Monomethylolureas are just as readily resinified as DMU or insolubilized by heating or by adding acids; they can be used if desired in the present invention.

The rate of resinification of DMU in aqueous systems is dependent upon pH which is a measure of the amount of acid present. At low pH's corresponding to relatively high acidity the cure is rapid and as the pH rises, the cure is slowed down.

When an acid catalyst is added, it catalyzes the removal of water producing condensation.

Under the molding conditions, acids catalyze this kind of condensation. Both ammonium chloride and aluminum sulphate react to form acids under molding conditions which catalyze the reaction and cause the resin to set up and harden. The speed of the hardening is dependent on the amount of hardener present as well as on other factors such as temperature and pressure. In general, the amount of hardener is adjusted to cause the resin to set in a reasonable time and at the given molding temperature. Generally the pH factor will be in the range of 1 to 6.

Although excellent results have been obtained by use of aluminum sulphate and ammonium chloride as hardeners, other materials known to catalyze the curing of thermosetting amino and phenolic resins can be used if desired.

Due to the heat and pressure in the molding operation, a small amount of formaldehyde is released and should the container or receptacle be used to merchandise products which would be adversely affected by free formaldehyde, it is necessary to combine the free formaldehyde during the molding operation. A small percentage of urea powder is, therefore, added to the molding composition which reacts with the free formaldehyde generated during the molding operation, with the result that the end product released from the mold has no free formaldehyde therein. Consequently, articles packaged in the containers or receptacles of the instant invention are in no way damaged by any free formaldehyde as would be the case if the urea powder were not added to the molding composition.

As mentioned hereinbefore, other thermosetting bonding agents selected from the group of amino plastics can be utilized in place of the urea formaldehyde. Among these are thiourea formaldehyde and melamine formaldehyde. There particular compounds react in a similar manner to the way urea reacts with formaldehyde.

Example III

The following formulation is used to produce small moldings having a relatively low impact strength, good porosity but relatively low water resistance.

| | Percent |
|---|---|
| Prepared sawdust | 88 |
| Thiourea formaldehyde (including hardener) | 10 |
| Wax powder | 2 |

The above composition was cured for two minutes in a mold at 222 to 250° F. at a pressure between 600 and 700 pounds per square inch.

Example IV

The following formulation is utilized for making moldings having a high impact strength, high hot water resistance, good durability, low porosity and excellent electrical property.

| | Percent |
|---|---|
| Prepared sawdust | 60 |
| Melamine formaldehyde (including hardener) | 40 |

The above formulation was cured for two minutes in the mold at 250 to 350° F. at a pressure of 1500 to 2000 pounds per square inch.

Phenolic resins as noted hereinbefore such as phenol formaldehyde, cresol formaldehyde, xylenol formaldehyde and resorcinol formaldehyde can be used in place of the amino plastics.

In these reactions, it is also necessary to add the urea powder as there is some free formaldehyde formed during the molding operation.

Example V

The following formulation is utilized for producing moldings having good water resistance, good impact strength, long life and medium porosity.

|  | Percent |
|---|---|
| Prepared sawdust | 70 |
| Resorcinol formaldehyde resin (including hardener) | 29.09 |
| Mold release agent | .01 |

The above formulation was cured for three minutes at between 300 and 310° F. at between 800 and 1000 pounds per square inch pressure.

Example VI

The following formulation may be utilized for the manufacture of larger components having long life, excellent hot water resistance, high impact strength, low porosity and good durability.

|  | Percent |
|---|---|
| Prepared sawdust | 70 |
| Phenol formaldehyde resin (including accelerator) | 24 |
| Wax powder | 6 |

The above formulation was cured for six minutes at between 300 and 330° F. at a pressure of between 2000 and 3500 pounds per square inch.

A minor proportion of a mold release composition is added to the compound prior to the molding operation. In addition, if the product is to have oustanding waterproof or water resistant characteristics, a percentage of wax powder may be added to the composition.

The proportions noted above are all calculated by weight and where liquids are used the quantities are based on the weight of their solids content.

As regards the proportions of the urea mentioned hereinbefore which are utilized to combine with the free formaldehyde released in the molding operation, it has been found that the percentage of urea can vary between 0.1% to 0.5% of the mix. The best results are obtained when using about 0.22% urea.

The use of synthetic resins for mass producing moldings of bonded sawdust that can be removed from the mold quickly and without fear of adherence thereto necessitates the use of mold release agents. It is customary to spray the molds with various mold release oils or silicones of various types, however, when operating fast molding machines, this operation would have to be done very frequently and at great speed.

In the molding compositions of the present invention, it has been found that by adding a very small proportion of a potent cationic surface active agent or detergent such as a blend of long-chain quaternary ammonium compounds such as dodecyl-tetradecyl- or hexadecyl-trimethyl-ammonium bromides to the mix, the molds are kept perfectly clear of any resin, and none of the molding composition adheres to the molds, even when the molding operation proceeds at high speed for long periods of time.

Thus, the time consuming and arduous task of applying conventional mold-release compounds to the molds is avoided in molding articles when utilizing the composition of the present invention.

In addition, it has been found that this cleaning action which occurs when utilizing the mold-release composition combined directly with the molding mix, reduces the curing time of the moldings as it allows the molding composition to make more intimate contact with the molds at the start of the molding and curing cycle.

Although superior results are obtained with the long-chain quaternary ammonium compounds, other mold release agents can be used in producing the composition of the present invention.

PROCESS

In the production of the receptacles or containers or other molded products as enumerated above, from the compositions described, a new and novel process for treating the sawdust and resins and other components of the composition to produce a molded product having the required light weight, strength, fracture resistance and permeability has been conceived.

As mentioned hereinbefore, the preferred wood from which to obtain the sawdust utilized in this invention is freshly sawn soft woods, although hard woods and sawdust produced therefrom can be used. Sawdust produced from hard or soft wood varies in its moisture content, and accordingly, in order to produce quality controlled moldings in the present process, it is necessary to reduce the moisture content of the sawdust to a known factor ranging between 0% to 16% moisture.

It has been found that the preferred level of moisture content for most purposes is between 2% and 5%.

If the moisture content of the sawdust is reduced to too low a percentage, it makes its mixing with the other chemicals difficult due to the fact that the surface of a very dry particle of wood does not readily accept a coating of the chemicals. On the other hand, should the sawdust have too high a moisture content, this results in the generation of steam in the molding operation which results in the fracture of the molded article upon ejection from the molding apparatus.

The sawdust initially is dried to the proper moisture content and thereafter is graded as to particle size. For certain types of moldings such as receptacles or containers, particularly useful in the horticultural field, it has been found that the typical analysis of the particle size is as follows:

Largest particle 2.7 millimeters
99% smaller than 2.0 millimeters
91% smaller than 1.0 millimeter
52% smaller than 500 microns
12.5% smaller than 200 microns For the production of larger moldings, however, a coarse grade of sawdust or wood particles can be used ranging up to chip size such as is produced by a wood planing machine or a lathe.

The grading of the sawdust is done by passing same through a hammer mill having a screen of suitable size, and the screen size is chosen in accordance with the desired article to be ultimately produced. A suitable screen must be chosen, since too coarse a screen will result in too large a particle size and ultimately a weak molding due to uneven distribution of the sawdust in the molds while too small a particle size provides a weak molding due to the increased surface area presented to the other ingredients in the mixer resulting in incomplete coverage of all sawdust particles.

The prepared dried and graded sawdust is mixed with the other ingredients in a pressure type mixer so designed as to create a pressure on the mix while it is being agitated in the mixer and thus obtaining a homogeneous molding composition. A conventional continuous type of mixer can be used provided with a restriction at its ouput end so that a back pressure is created in the last stages of the mixing operation. The pressure within the pressure mixer will, of course, vary with the type of composition used therein, the size of particle, the speed of the mixer and the humidity content thereof. This pressure in the mixer can vary between one ounce to 25 pounds per square inch. In the use of the composition of Examples I and II as noted above, a pressure in the mixer of the order of 2.5 pounds per square inch has been found to produce a product having the desired characteristics as to porosity, permeability, fracture resistance, etc. The use of too great a pressure in the mixer will result in the production of excessive heat, partial or complete curing of the mix and subsequent seizure of the mixer, while too low a pressure will result in insufficiently coated particles and a weak molding.

Figure 3:
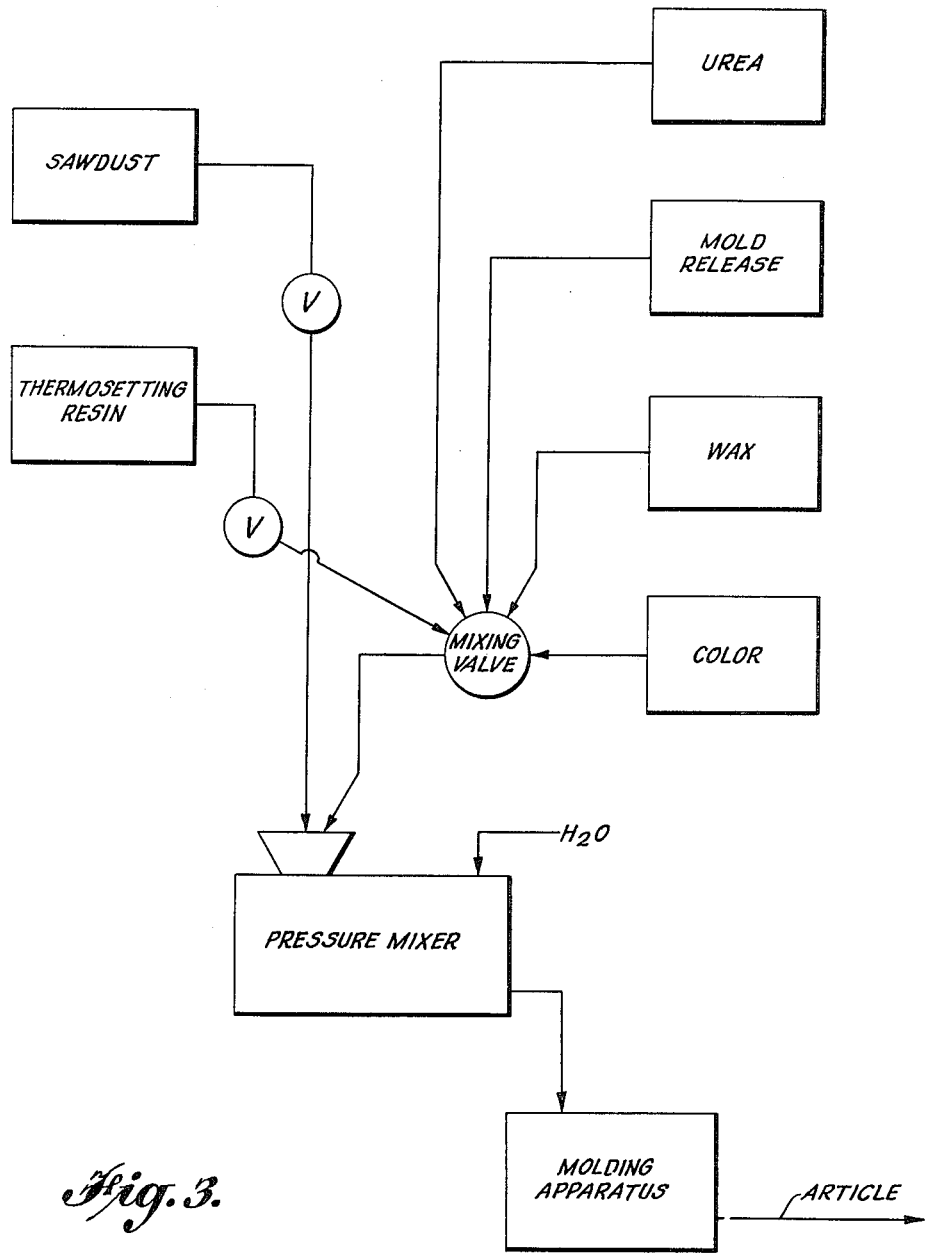
FIG. 3 is a schematic diagram illustrating the general steps of the process of forming the container or receptacle of FIG. 1.

In the process, as generally disclosed in FIG. 3, the pretreated sawdust, resin and hardener, wax and other ingredients may be separately maintained in dispensing bins or receptacles and the proper proportions of the sawdust, resin, etc. are fed automatically through the medium of metering devices to the mixer in the proper proportions to formulate a container or receptacle having the desired characteristics as to permeability, fracture resistance, etc.

It may be necessary to add water to the previously dried sawdust to maintain a humidity or moisture content of between 3 and 20% when the sawdust is in the mixer. The moisture content in this range facilitates the thorough homogeneous mixing of the sawdust, resin, wax and other ingredients. In the examples noted herein, it has been found that a moisture content of the molding composition in the pressure mixer of between 11 and 13% is adequate for most mixing operations.

The addition of water to the pressure mixer is preferably made at a point in the mixer remote from the entry of the dry ingredients. If the water were added to the mixer at the same point as the dry ingredients excessive build up in the mixer of a sticky nature would result. The sticky composition would gradually cure and subsequently clog the mixer.

The addition of the water to the mixer at a point intermediate of its length where the dry ingredients are already partially mixed avoids the aforementioned build up of wet, sticky material, and assures long and continuous mixer operation without costly shutdowns.

The resin, wax, urea and other components of the composition are added to the pressure mixer individually or premixed in the proper proportions and added after the sawdust. The addition of the various ingredients to the pressure mixer is greatly simplified if the individual ingredients, except the sawdust, are first reduced to a powder form and premixed in the proper proportions prior to their addition to the mixer. This insures an even distribution of the minor ingredients and has great advantages when used in any continuous system employing metering devices.

In the production of one type of container or receptacle particularly for use in the horticultural field, it is extremely important that the containers be porous and yet not allow the potting soil or other contents of such containers to dry out too rapidly. In addition, such containers should be water resistant over long periods of time and in addition, be easy to handle and store. Such containers also should be non-toxic to plant life and not absorb useful chemicals from the soil. The porosity of the containers of this invention is of the non-capillary nature and, although excess water can circulate freely through the container, moisture from the soil inside of the container does not tend to be drawn outwardly by capillary action. Containers, therefore, of the nature of this invention when used in the horticultural field require up to 50% less watering than conventional clay containers and, in addition, due to the lack of capillary action do not provide a refrigerating effect on the contents of the container such as is normally found in clay containers. Thus, the contents of the containers of the present invention are maintained at a temperature of 1 to 10 degrees F. warmer than the contents of clay receptacles of similar size.

In order to maintain the containers of the present invention porous, it is not only necessary to adjust the proportions of resin and sawdust but also to control the closing pressure of the molds so as to obtain a molding density of about 1 gram per cubic centimeter. By maintaining the pressure between the parts of the mold between 600 to 800 pounds per square inch, a molding or product having the above noted density is produced.

In order that the receptacles of the present invention be resistant to humid atmospheres, it is advantageous to add a water repellent material, such as wax, to the molding mixture particularly when using thermosetting resins which are not of themselves sufficiently waterproof to produce a waterproof or moisture resistant product. Horticultural containers having excellent characteristics have been made by the incorporation of a powdered hard white paraffin wax in the molding composition, the wax having a melting point of between 145 to 153° F. In choosing the correct wax to use, it is necessary to take into consideration the working heat of the dies for the particular product being produced since a wax having a melting point which is too high for the purpose will prevent an even distribution of the composition in the molds. Conversely, a wax having too low a melting point is difficult to granulate.

By mixing the powdered wax with the other ingredients in the pressure mixer as described above, the sawdust is coated in such a way as to make it possible to increase the percentage of wax. In the present process, it is possible to increase up to 10% wax without destroying the bond or producing any detrimental effects in the molded product. It has been found that the friction produced between the mixer elements and the composition in the pressure mixer allows the wax film formed on the surface of the wood particles to break down and the wax penetrates into the wood fibers whereas the gluing medium or resinous material is arrested on the surface of the wood particles and serves as the bonding agent, the majority of the wax being absorbed in the wood and rendering the molded product water resistant or waterproof.

The molding composition is maintained in the pressure mixer under the required pressure for a sufficient period of time to allow a thorough coating of each particle of sawdust with the resin mixture and, in addition, allow the absorption of the wax and to produce as homogeneous a mixture as possible. Thereafter, the molding composition is forced from the exit of the pressure mixer into the molding apparatus which may be of the conventional type normally used to mold containers of the size desired. The molding composition is deposited into the molds of the molding machine and the temperature in the molding machine is maintained at between 200 and 350° F. The pressure therein being maintained at between 600 and 3500 pounds per square inch depending upon the porosity and other characteristics desired in the finished product. In general, products having the desired porosity particularly for use as horticultural containers are best molded at a temperature of between 220 and 250° F. at a pressure of between 600 and 800 pounds per square inch. The normal curing time for resins and compositions of the present invention will vary between about ½ and 6 minutes, 1 to 2 minutes usually being sufficient to provide the desired characteristics.

Applicant has invented a new article of commerce particularly adapted for use as a horticultural container or other container and, further, has provided new and novel molding compositions which produce articles having the desired characteristics as enumerated, and, in addition, the accumulation of algae on the outside of applicant's pot is considerably less than the algae that will accumulate on a clay pot of substantially the dimensions of applicant's pot and under substantially similar conditions. In some instances, half or even less algae accumulates on applicant's pot as compared with said clay pot. Further, applicant has invented a new and novel process for utilizing the compositions as noted herein to produce a molded product having the characteristics of permeability, light weight, fracture resistance and porosity which particularly adapt such containers for use in the horticultural field.

By actual test and use of applicant's invention as embodied in horticultural containers, such as flower pots, these pots have indeed been found to have been very tough notwithstanding their lightness, and to be of good porosity and requiring less watering of the plant or seeds as the case may be, and it has been noted that the plant growth in applicant's pots is quite vigorous. Moreover, applicant's pots are easy to turn out for repotting or transplanting outside and their breakage is substantially negative. The interior rings or stepped arrangement of the flower pots diverts water placed therein and permits the water to more readily saturate the soil in the pot and this has resulted in encouraging root growth around the diverting rings throughout the depth of the pot as distinguished from the roots in clay pots which have their growth at the bottom of the pots. The water or moisture diverting rings also serve a useful purpose for "knock out" which is more readily attained with applicant's pots than clay pots as the soil in its massed condition is "knocked out" of the container without disturbing the root growth. Some florists have found that applicant's pots are so warm as distinguished from clay pots that the plant in applicant's pots has an advantage of 7 to 14 days in growing time as compared with clay pots of substantially the same dimensions as applicant's pots and under similar conditions.

It is to be understood that while applicant's invention is eminently favorable for horticultural containers, it is likewise adaptable and suitable for other products be they hollow or solid; for instance, the product may be in plank or sheet form, if desired.

Further, applicant's process is particularly applicable to the molding of sawdust and a thermosetting binder such as urea formaldehyde and although specific embodiments of the invention have been described herein, it is not intended to limit the invention soley thereto, but to include all of the obvious variations and modifications within the spirit and scope of the appended claim.

I claim:

A process of forming a molded product comprising mixing in the dry state in a pressure mixer under a pressure of from one ounce to 25 pounds per square inch, 60–90 percent sawdust of a particle size of from 200 microns to 2.7 millimeters, said sawdust having a moisture content of from 0 to 16 percent, 10–40 percent of a thermosetting formaldehyde resin selected from the group consisting of phenol formaldehyde and amine formaldehyde, said percentage including 0.1 to 0.5 percent urea powder, said urea powder being sufficient to combine with any free formaldehyde released during the molding, 1 to 10 percent paraffin wax and a release agent selected from the group consisting of dodecyl-trimethyl ammonium bromide, tetradecyl-trimethyl ammonium bromide and hexadecyl-trimethyl ammonium bromide, all of said percentages being by weight of the composition, and subsequently molding the mixture at a temperature of between 200° and 350° F. for ½ to 6 minutes at a molding pressure of between 600 to 3500 pounds per square inch.

References Cited in the file of this patent

UNITED STATES PATENTS

| | | |
|---|---|---|
| 1,785,101 | Sutherland | Dec. 16, 1930 |
| 1,905,999 | Ellis | Apr. 25, 1933 |
| 1,961,579 | Bren | June 5, 1934 |
| 2,290,946 | Dearing et al. | July 28, 1942 |
| 2,329,172 | Smidth | Sept. 7, 1943 |
| 2,381,205 | Caughey | Aug. 7, 1945 |
| 2,898,314 | Shepardson | Aug. 4, 1959 |
| 2,962,459 | Ash et al. | Nov. 29, 1960 |

FOREIGN PATENTS

| | | |
|---|---|---|
| 774,805 | Great Britain | May 15, 1957 |

OTHER REFERENCES

Serial No. 369,752 (A.P.C.), published Apr. 27, 1943.